United States Patent
Harris et al.

(10) Patent No.: US 7,583,973 B2
(45) Date of Patent: Sep. 1, 2009

(54) SYSTEM AND METHOD FOR ESTABLISHING COMMUNICATIONS BETWEEN MOBILE STATIONS

(75) Inventors: John M. Harris, Chicago, IL (US); Ronald T. Crocker, St. Charles, IL (US); Thomas B. Hart, West Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 342 days.

(21) Appl. No.: 11/272,282

(22) Filed: Nov. 10, 2005

(65) Prior Publication Data

US 2007/0105564 A1 May 10, 2007

(51) Int. Cl.
*H04L 29/06* (2006.01)
*G08B 5/22* (2006.01)

(52) U.S. Cl. .................... 455/458; 455/414.3; 340/7.28
(58) Field of Classification Search ................. 455/458, 455/414; 340/7
See application file for complete search history.

(56) References Cited

U.S. PATENT DOCUMENTS 6,134,433 A * 10/2000 Joong et al. ................. 455/417
2002/0155844 A1* 10/2002 Rankin et al. ............... 455/456

* cited by examiner

*Primary Examiner*—Nick Corsaro
*Assistant Examiner*—Joel Ajayi

(57) ABSTRACT

A page request (112) is received. When a user preference is not up-to-date, a non-acceptance message (116) is appended to a page response (114) and channel assignment is altered when the page response (114) includes the non-acceptance message (116).

18 Claims, 4 Drawing Sheets

SYSTEM AND METHOD FOR ESTABLISHING COMMUNICATIONS BETWEEN MOBILE STATIONS

FIELD OF THE INVENTION

The field of the invention relates to communications made between mobile stations in networks and, more specifically, establishing communications with mobile stations in these networks.

BACKGROUND OF THE INVENTION

Modern communication systems offer many types of services to users. For instance, e-mail services, voice communication services, and Internet services are a few of the services available to users of today's systems. Due to the many types of services available, however, some users may not wish to support or respond to all services or service requests at all times. Consequently, many systems allow a user at their subscriber unit to indicate a user preference of services specifying the types of services that they will accept or will not accept. For instance, a subscriber may wish to accept e-mail communications, but not want to accept voice communications. Such user preferences are also typically updated, sometimes frequently and at other times infrequently, depending upon the type of system.

In addition, users may not choose to accept communications in other types of situations. For example, mobile stations typically include memory units. The mobile stations may not be willing to accept calls when memory capacity is or will become exceeded. In another example, a user may participate in a peer-to-peer call or use a type of Radio Frequency (RF) technology about which the system is unaware.

Because of the number and type of services used, many types of systems, including many cellular communication systems, have suffered from having inadequate communication capacities. In these situations, user preferences could be used to alleviate some of the capacity problems by allowing users to accept or reject different types of services.

Unfortunately, previous systems did not adequately alleviate capacity issues, and frequently made the problems worse due to the frequency of updating user preferences. For example, if a mobile station detected that the user was busy, then the user preferences were updated often regardless of whether the preferences actually changed. This frequent updating resulted in the waste of system resources and the degradation of call processing services.

On the other hand, less frequent updating in other previous systems led to other problems. Infrequent updating resulted in the system having out-of-date preferences in situations where the preferences of a target mobile station had changed, but had not yet been communicated to the system. Consequently, a communication channel might be assigned to a call, only to have the target mobile station later reject the service. Inadequate updating of the user preferences also led to frequent re-paging of the mobile station even though the target mobile station would not respond to pages requesting the unacceptable service type. As a result of these problems, the capacity problems associated with the system worsened and user frustration with the system increased.

Figure 1:
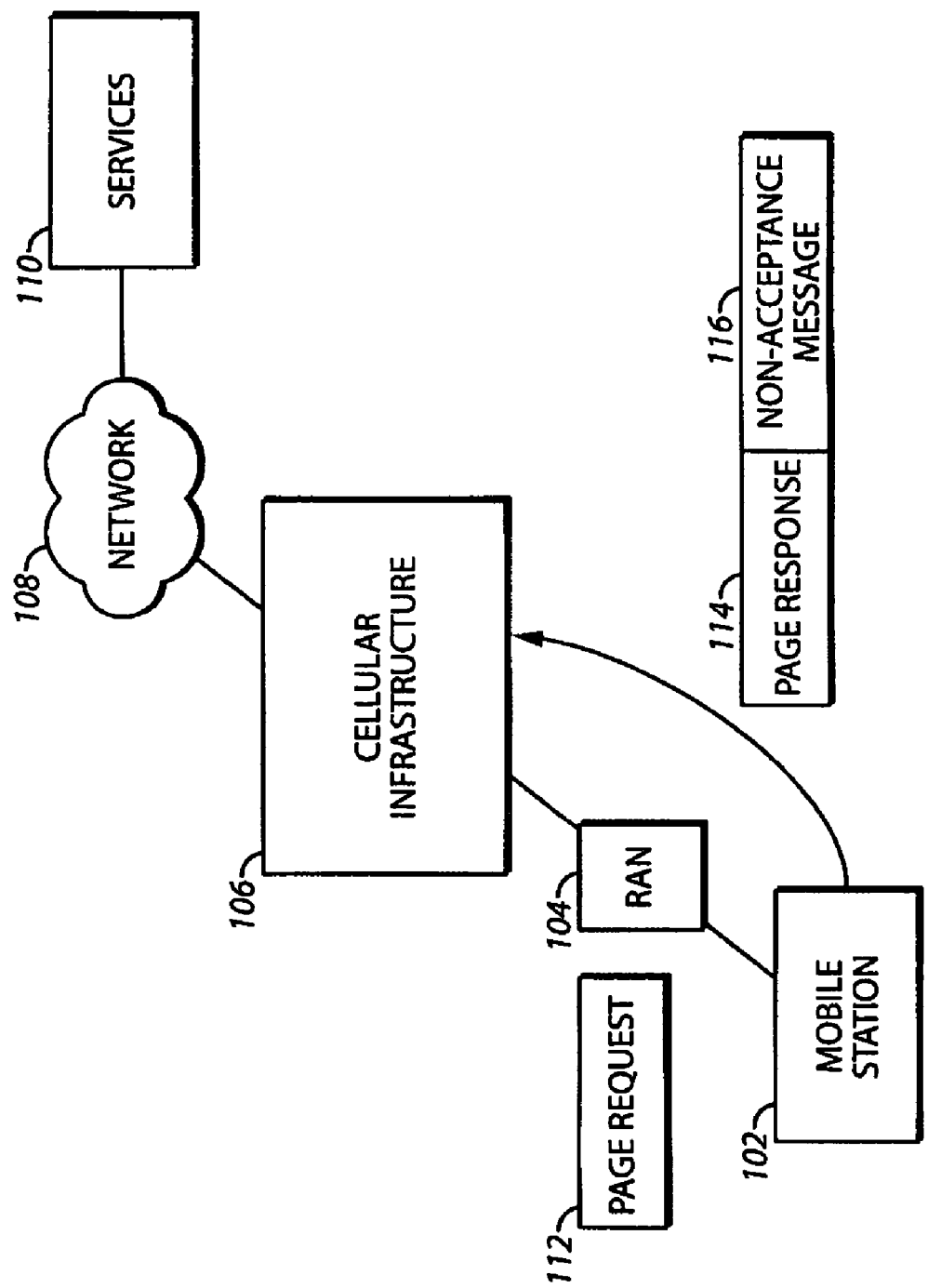
FIG. 1 is a block diagram of a system for establishing a connection with a mobile station according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A method and system is described that efficiently allow a mobile station to determine user preferences at the time of a call, when these preferences will likely impact call processing. As a result, user preferences are updated when needed and calls can be correctly processed. System capacity and efficiency are also enhanced.

In many of these embodiments, a page request is received. In one example, the page request may indicate a service type. When a user preference is not up-to-date, a non-acceptance message is appended to a page response and channel assignment is altered when the page response includes the non-acceptance message.

In some examples, a service type is included in the page request. In this case, a non-acceptance message is appended to a page response when the user preference is not up-to-date, the user preference shows that a user is unavailable to more than a threshold number of sub-services in the service type, and a last user update showed the user as being available to the sub-services.

Channel assignment may be altered in a variety of ways. For instance, channel assignment may be prohibited or delayed. In addition, different types of information can be appended to the page response. For example, the identity of a subset of the service that is unacceptable may be appended to the page response. In another example, an indication that the service is unacceptable may be appended.

In others of these embodiments, it is determined whether to alter the channel assignment based upon a user preference update at a time of the call. In this example, the cellular infrastructure may detect that a message has been appended to the page response and the message preferably contains an updated set of user preferences.

Thus, a mobile station is able to determine user preferences at the time of a call when these preferences will likely impact call processing. As a result, user preferences are updated when needed and calls can be correctly processed. User experience with the system is also enhanced and system resources are conserved.

Referring now to FIG. 1, one example of a system for establishing communications with a mobile station is described. A mobile station 102 is communicatively coupled to a Radio Access Network (RAN)104. The RAN 104 is in turn coupled to a cellular infrastructure 106. The cellular infrastructure 106 is coupled to a network 108, which is, in turn is coupled to various network services 110.

The mobile station 102 may be any type of mobile user device such as a cellular telephone, a pager, a personal computer, or a personal digital assistant. Other examples of mobile stations are possible.

The RAN 104 includes components that allow the mobile station 102 to communicate with the cellular infrastructure 106. For example, the RAN 104 may include base stations, base station controllers (BSCs), and/or other devices to provide these functions.

The cellular infrastructure 106 includes elements that route or control communications received from the mobile station 102. For example, the cellular infrastructure 106 may include switches and controllers for performing these functions.

The network 108 may be any type of communication network. For example, the network 108 may be the Internet, a wireless network, a packet-based network or any combination of these networks. Other examples of networks and combination of networks are possible.

The services 110 may represent any type of network service or combination of services provided to the mobile station 102. For instance, the service 110 may be video services, email services, conferencing services, or audio services. Other examples of services are possible.

Such elements, systems, and services are generally known in the art. In general, these teachings are not particularly sensitive to the selection of any particular element, system, or service except as may be particularly noted herein. For all these reasons and further for the sake of brevity, additional elaboration regarding such elements, systems and services will not be provided here.

In one example of the operation of the system of FIG. 1, a page request 112 is sent by the infrastructure 108, through the RAN 106, to the mobile station 102. The page request represents an attempt by a user or service to contact and/or establish a communication link with the mobile station 102. The page request 112 may indicate a service type and, in some approaches, the page request may correspond to a service for which the user preference is not up-to-date.

A user preference may be established indicating that a preference for services or conditions for a user at the mobile station 102. The mobile station 102 may determine whether the user preference is up-to-date in a variety of ways. For example, the mobile station may consult its memory to determine its last preference update and its current preferences. The mobile station may also use, if available, information regarding what category of service is being initiated by the network. Comparing the last preference update with the current preferences for the service category which is being initiated is performed. If the comparison yields more than a threshold fraction of services within this category as now unavailable according to current preferences, but these were listed as available in the last preference update communicated to the network, then the mobile station may decide to append the preference update to the response to the network indicating the preferences are not up-to-date.

When the user preference is not up-to-date, a non-acceptance message 116 is appended to a page response 114 and sent from the mobile station 102, to the RAN 104, and then to the infrastructure 106. In addition, different types of information can be appended to the page response. For example, the identity of a subset of the service that is unacceptable may be appended. In another example, an indication that the service is unacceptable may be appended.

The messages are received at the infrastructure 106 and channel assignment is altered when the page response includes the non-acceptance message 116. Channel assignment may be altered by the infrastructure 106 in a variety of ways. For instance, channel assignment may be prohibited or delayed. In other examples, channel assignment may be prohibited or delayed for a predetermined time period or for a time period that is dependent upon system conditions.

In another example, it is determined by the infrastructure 106 whether to alter the channel assignment based upon a user preference update at the time of the call. In this example, the cellular infrastructure 106 may detect that the message 116 has been appended to the response 114 and the message 116 preferably contains an updated set of user preferences.

Figure 2:
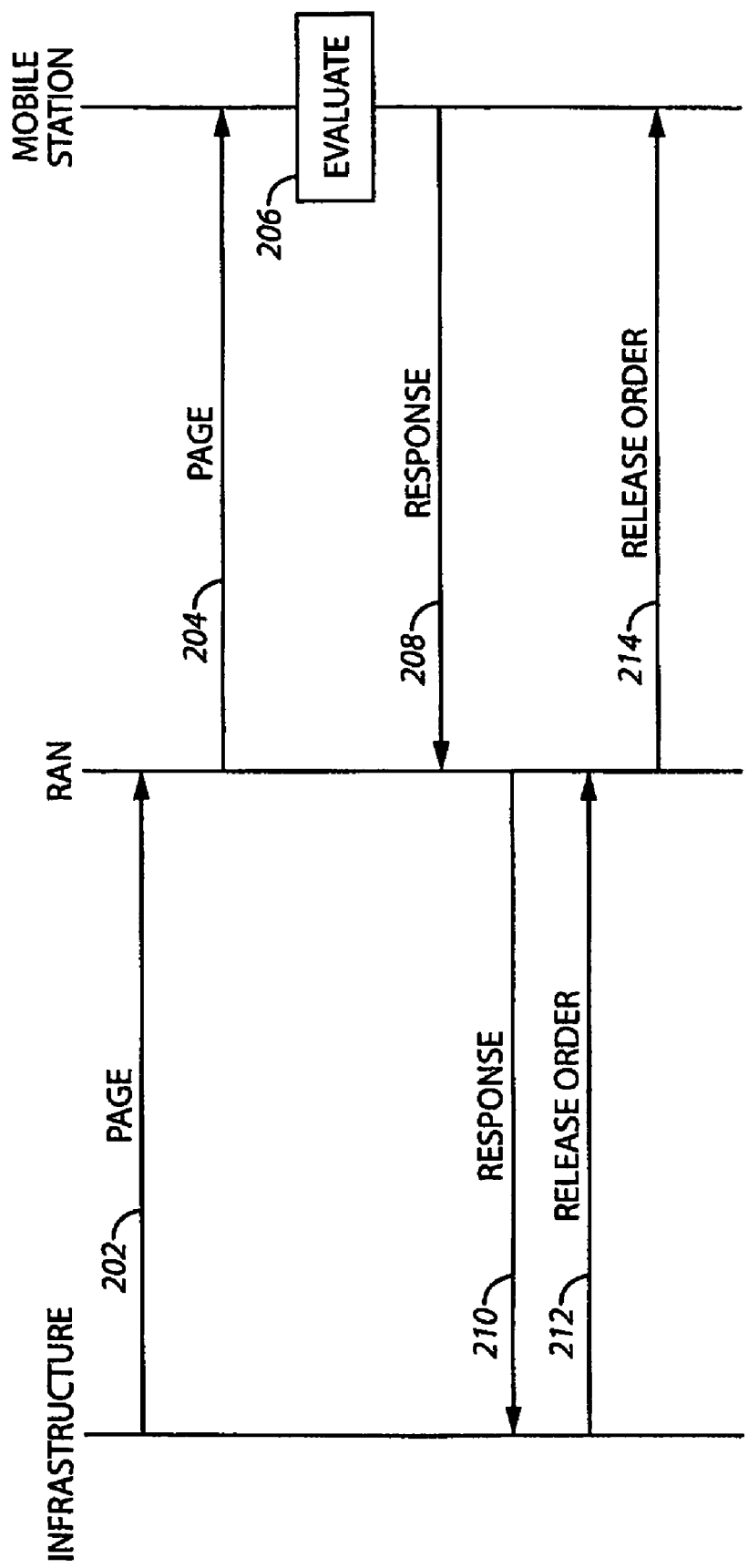
FIG. 2 is a call flow diagram for establishing communications with a mobile station according to the present invention.

Referring now to FIG. 2, one example of an approach for establishing communications with a mobile station is described. At step 202, a page is sent from the communication infrastructure to a Radio Access Network (RAN). At step 204, the page is sent from the RAN to the target mobile station. The page may indicate a type of service that is being requested.

At step 206, the mobile station evaluates the page. The mobile station determines whether to append a non-acceptance message to a page response based upon the service-type (indicated in the page) and whether user preferences have been recently updated.

At step 208, a response (including the non-acceptance message) is sent to the RAN. At step 210, the response is sent to the infrastructure. At step 212, a release order is sent from the infrastructure to the RAN. At step 214, the release order is sent from the RAN to the mobile station. In other approaches, the release order may be an alternate type of message.

Figure 3:
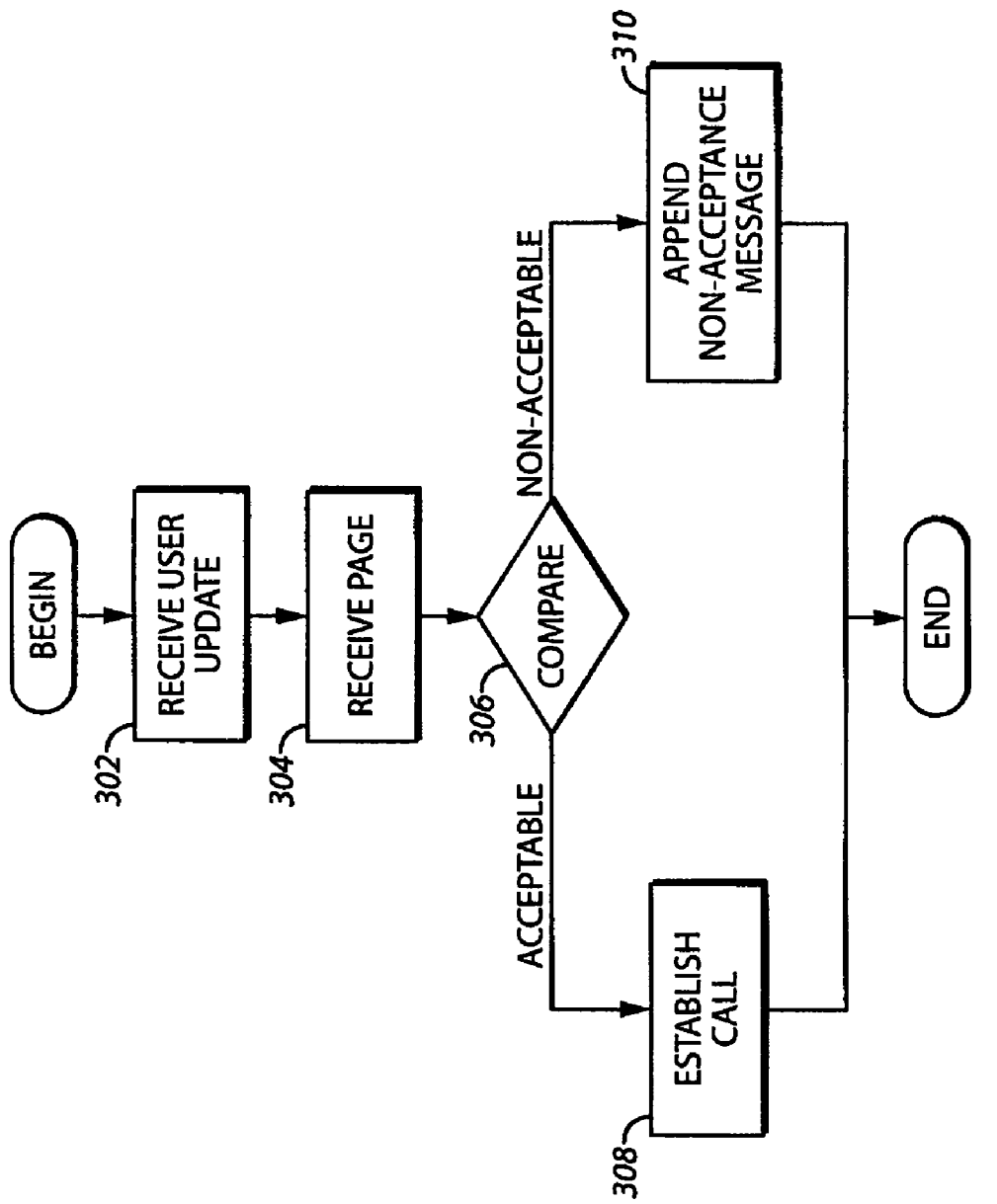
FIG. 3 is a flowchart of an approach for determining whether to issue a non-acceptance message according to the present invention.

Referring now to FIG. 3, an example of an approach of evaluating a page is described. At step 302, a user update is received. The user update may include a list of services or identities of originators that the user may wish to accept or not accept. In one example, the user may choose to accept email services while rejecting voice communication services. In another example, a first user may accept calls from a second users, but may not accept calls from a third user.

At step 304, a page is received. The page may indicate a type of service that another user wishes to establish with the user. At step 306, a comparison is made between the preferences of the user to the service type indicated in the page. For example, the system may examine a list of services and compare the list to the services in the page. If the service is acceptable, at step 308, a call is established. If it is not acceptable, at step 310 a non-acceptance message is appended to a page response.

Figure 4:
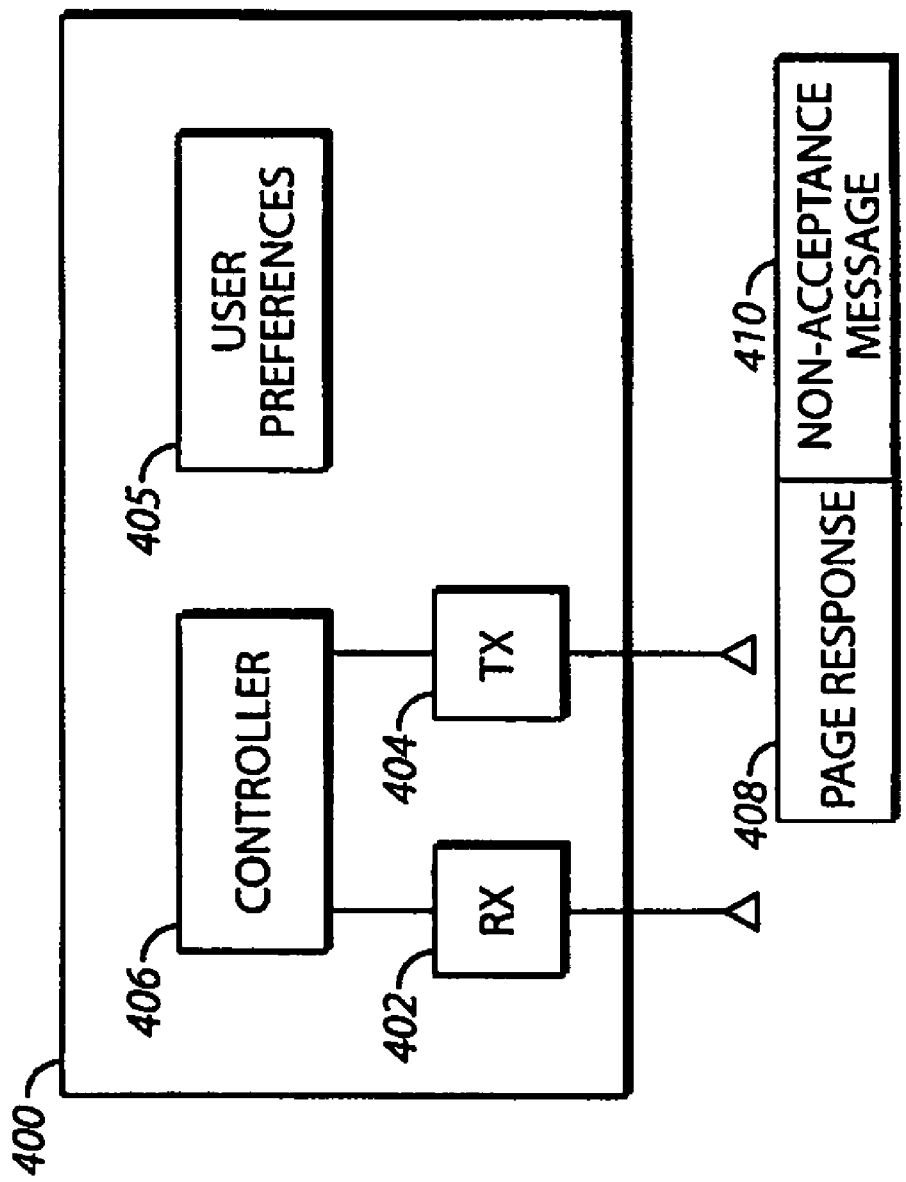
FIG. 4 is a block diagram of a communication device according to the present invention.

Referring now to FIG. 4, one example of a device 400 that issues a non-acceptance message when the user preferences are not up-to-date is described. The device 400 includes a receiver 402, a transmitter 404, and a controller 406.

The receiver 402 receives a page request message. The page request message may indicate an associated service type. The controller 406 is coupled to the receiver 402 and the transmitter 404 and is programmed to receive a page request from the receiver 402 and to determine whether the page request corresponds to a service for which the user preference 405 is outdated. The controller 406 is further programmed to append a non-acceptance message 408 to a page response 410 whenever the user preference 405 is outdated and transmit the page response 410 and the non-acceptance message 408 via the transmitter 404 to an infrastructure element.

Thus, a mobile station is able to determine user preferences at the time of a call when these preferences will likely impact call processing. As a result, user preferences are reflected when needed and calls can more likely be correctly processed. System resources are conserved and the experience of the user with the system is enhanced.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of increasing system capacity in a network comprising:
    receiving a user update to a list of user preferences wherein the list of user preference specifies services to which a mobile station will accept and will not accept and conditions for acceptance;
    receiving a page request;
    comparing the page request to the updated list of user preferences to determine if the page request is acceptable and that the user preference list is not up-to date;
    appending a non-acceptance message to a page response when in the step of comparing determines that the page request is not acceptable and the user preference is not up-to-date and wherein the non-acceptance message includes the updated list of user preferences; and
    altering channel assignment when the page response includes the non-acceptance message.

2. The method of claim 1 wherein receiving a page request comprises receiving a page request having a service type and wherein appending a non acceptance message comprises appending a non-acceptance message to a page response when a user preference is not up-to-date and the user preference shows that a user is unavailable to more than a threshold number of sub-services in the service type and a last user update showed the user as being available to the sub-services.

3. The method of claim 1 further comprising determining whether the page request corresponds to a service for which the user preference is not up-to-date.

4. The method of claim 1 wherein altering channel assignment comprises prohibiting channel assignment.

5. The method of claim 1 wherein altering channel assignment comprises delaying channel assignment.

6. The method of claim 1 wherein appending a non-acceptance message comprises appending a message indicating an identity of a subset of the service that is unacceptable.

7. The method of claim 1 wherein appending a non-acceptance message comprises appending a message indicating the service is unacceptable.

8. The method of claim 1 where altering the channel assignment comprises determining whether to alter the channel assignment based upon a user preference update at a time of the call.

9. The method of claim 8 further comprises a cellular infrastructure comparing a user preference update received during a call establishment with a packet which is causing a call to be initiated.

10. The method of claim 9 further comprises the cellular infrastructure detecting a message has been appended to the mobile response, wherein that message likely contains an updated set of user preferences.

11. A method of increasing system capacity in a network comprising:
    at a mobile station:
    receiving a user update to a list of user preferences wherein the list of user preference specifies services to which the mobile station will accept and will not accept and conditions for acceptance;
    receiving a page request;
    comparing the page request to the updated list of user preferences to determine whether the page request corresponds to a service for which the user preference is outdated;
    when the user preference is outdated, appending a non-acceptance message to a page response wherein the non-acceptance message includes the updated list of user preferences.

12. The method of claim 11 further comprising:
    at the cellular infrastructure:
    prohibiting channel assignment when the page request includes the non-acceptance message.

13. The method of claim 12 wherein appending a non-acceptance message comprises appending a message indicating an identity of a subset of a service that is unacceptable.

14. The method of claim 11 wherein appending a non-acceptance message comprises appending a message indicating the service is unacceptable.

15. A device for increasing the system capacity in a network comprising:
    a receiver having an input to receive a page request message;
    a transmitter having an output; and
    a controller coupled to the receiver and the transmitter, the controller programmed to receiving a user update to a list of user preferences wherein the list of user preference specifies services to which a mobile station will accept and will not accept and conditions for acceptance; receiving a page request at the input of the receiver and comparing page request to the updated list of user preferences to determine whether the page request corresponds to a service on the updated list of user preference and to determine if the list of user preferences is outdated, the controller being further programmed to append a non-acceptance message to a page response whenever the user preference is outdated and transmit the page response and non-acceptance message at the output of the transmitter to an infrastructure element and wherein the non-acceptance message includes the updated list of user preferences.

16. The device of claim 15 wherein the non-acceptance message comprises an identity of a subset of the service that is unacceptable.

17. The device of claim 15 wherein the non-acceptance message comprises an indication that the service is unacceptable.

18. The device of claim 15 wherein the page request message includes a service type.

* * * * *